US012799867B2

(12) United States Patent
Nakamura et al.

(10) Patent No.: US 12,799,867 B2
(45) Date of Patent: Nov. 17, 2026

(54) STEAM TURBINE

(71) Applicant: MITSUBISHI HEAVY IND. COMPRESSOR CORP., Hiroshima (JP)

(72) Inventors: Yuki Nakamura, Hiroshima (JP); Shunsuke Fuchiwaki, Hiroshima (JP)

(73) Assignee: MITSUBISHI HEAVY INDUSTRIES COMPRESSOR CORPORATION, Hiroshima (JP)

( * ) Notice: Subject to any disclaimer, the term of this patent is extended or adjusted under 35 U.S.C. 154(b) by 0 days.

(21) Appl. No.: 19/371,108

(22) Filed: Oct. 28, 2025

(65) Prior Publication Data

US 2026/0210251 A1 Jul. 23, 2026

(30) Foreign Application Priority Data

Jan. 20, 2025 (JP) ................................ 2025-007857

(51) Int. Cl.
*F01D 1/04* (2006.01)
*F01D 25/16* (2006.01)
*F01D 25/24* (2006.01)

(52) U.S. Cl.
CPC ............ *F01D 1/04* (2013.01); *F01D 25/164* (2013.01); *F01D 25/24* (2013.01); *F05D 2220/31* (2013.01); *F05D 2240/126* (2013.01)

(58) Field of Classification Search
CPC ........ F01D 25/30; F01D 25/24; F01D 25/165; F01D 1/04; F05D 2220/31; F05D 2240/164
See application file for complete search history.

(56) References Cited

U.S. PATENT DOCUMENTS 6,261,055 B1 * 7/2001 Owczarek ................ F01D 1/02 415/211.2
11,118,476 B2 * 9/2021 Hase ...................... F01D 25/24
(Continued)

FOREIGN PATENT DOCUMENTS

JP 2012067604 A 4/2012
JP 2013174160 A 9/2013

*Primary Examiner* — Nathaniel E Wiehe
*Assistant Examiner* — Maxime M Adjagbe
(74) *Attorney, Agent, or Firm* — Osha Bergman Watanabe & Burton LLP

(57) ABSTRACT

A steam turbine includes: a rotor shaft that rotates about an axis; a plurality of rotating blade rows fixed to an outer side in a radial direction of a surface of the rotor shaft about the axis and arranged at intervals in an axial direction in which the axis extends; a casing that covers the rotor shaft and the plurality of rotating blade rows; stator blade rows fixed to the casing and arranged at intervals on a first side in the axial direction with respect to the rotating blade rows; and bearings that are fixed to the casing and rotatably support the rotor shaft. The casing includes a flow guide that guides steam flowing out of a rotating blade row in a last stage arranged closest to a second side in the axial direction among the plurality of rotating blade rows to an outside of the casing, a packing portion arranged at an interval on an inner side in the radial direction with respect to the flow guide, the bearings being attached to the packing portion, and a plurality of ribs connecting the flow guide and the packing portion, extending in the radial direction, and arranged at intervals in a circumferential direction about the axis.

2 Claims, 3 Drawing Sheets

(56) References Cited

U.S. PATENT DOCUMENTS

| | | | | |
|---|---|---|---|---|
| 2012/0163969 | A1* | 6/2012 | Ongole .................. | F01D 25/30 415/210.1 |
| 2013/0051996 | A1* | 2/2013 | Hoeger ..................... | F01D 9/06 415/185 |
| 2013/0224006 | A1 | 8/2013 | Saeki et al. | |

* cited by examiner

STEAM TURBINE

CROSS-REFERENCE TO RELATED APPLICATIONS

This application claims the benefit of priority to Japanese Patent Application Number 2025-007857 filed on Jan. 20, 2025. The entire contents of the above-identified application are hereby incorporated by reference.

TECHNICAL FIELD

The disclosure relates to a steam turbine.

RELATED ART

A steam turbine includes a rotor (turbine rotor) arranged in a casing, a rotating blade row included on a radially outer side of the rotor, a diaphragm included on a radially inner side of the casing, and a stator blade row supported on a radially inner side of the diaphragm (see, for example, JP 2013-174160 A and JP 2012-67604 A).

SUMMARY

Such a high-and-low-pressure single-casing steam turbine may have a structure in which an exhaust casing of the casing also has a function of supporting a bearing. The exhaust casing may adopt a structure formed of a steel plate for weight reduction. In such a case, support rigidity of the bearing at an exhaust chamber may be insufficient, the bearing may vibrate, and axial vibration of a rotor shaft may increase. Therefore, there is a demand for stably supporting the bearing in the casing and improving reliability of axial vibration.

The disclosure has been made to solve the above problems, and an object is to provide a steam turbine that can improve reliability of axial vibration.

To solve the above problems, a steam turbine according to the disclosure includes: a rotor shaft that rotates about an axis; a plurality of rotating blade rows fixed to an outer side in a radial direction of a surface of the rotor shaft about the axis and arranged at intervals in an axial direction in which the axis extends; a casing that covers the rotor shaft and the plurality of rotating blade rows; stator blade rows fixed to the casing and arranged at intervals on a first side in the axial direction with respect to the rotating blade rows; and bearings that are fixed to the casing and rotatably support the rotor shaft. The casing includes a flow guide that guides steam flowing out of a rotating blade row in a last stage arranged closest to a second side in the axial direction among the plurality of rotating blade rows to an outside of the casing, a packing portion arranged at an interval on an inner side in the radial direction with respect to the flow guide, the bearings being attached to the packing portion, and a plurality of ribs connecting the flow guide and the packing portion, extending in the radial direction, and arranged at intervals in a circumferential direction about the axis.

The steam turbine of the disclosure can improve reliability of axial vibration.

BRIEF DESCRIPTION OF DRAWINGS

The disclosure will be described with reference to the accompanying drawings, wherein like numbers reference like elements.

DESCRIPTION OF EMBODIMENTS

Hereinafter, an embodiment for carrying out a steam turbine according to the disclosure will be described with reference to the accompanying drawings. However, the present invention is not limited to this embodiment alone.

Embodiment

Configuration of Steam Turbine

Figure 1:
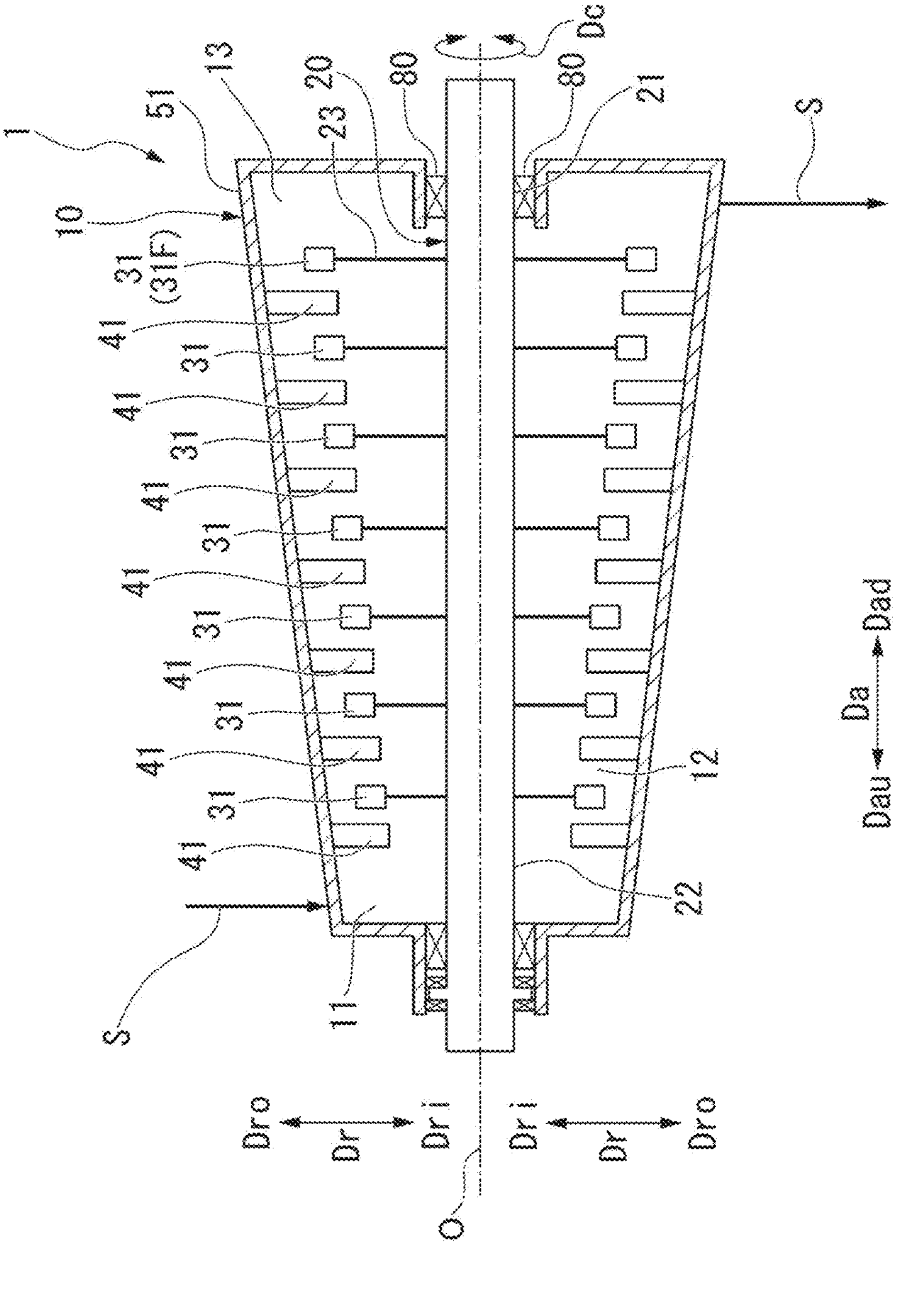
FIG. 1 is a schematic diagram illustrating an overall configuration of a steam turbine according to an embodiment of the disclosure.

As illustrated in a schematic diagram in FIG. 1, a steam turbine 1 according to the present embodiment includes a rotor 20 that rotates about an axis O, a casing 10 that covers the rotor 20, a plurality of stator blade rows 41, and a bearing 80 that rotatably supports the rotor 20.

Note that hereinafter, for convenience of description, a direction in which the axis O extends is an axial direction Da. A first side in the axial direction Da is an upstream side Dau, and a second side in the axial direction Da is a downstream side Dad. Inside the steam turbine 1, steam S flows from the upstream side Dau to the downstream side Dad in the axial direction Da. A radial direction at the rotor 20 with reference to the axis O is simply a radial direction Dr. A side approaching the axis O in this radial direction Dr is an inner side Dri in the radial direction Dr, and a side of this radial direction Dr opposite to the inner side Dri in the radial direction Dr is an outer side Dro in the radial direction Dr. A circumferential direction of the rotor 20 about the axis O is simply a circumferential direction Dc.

Configuration of Rotor

Figure 2:
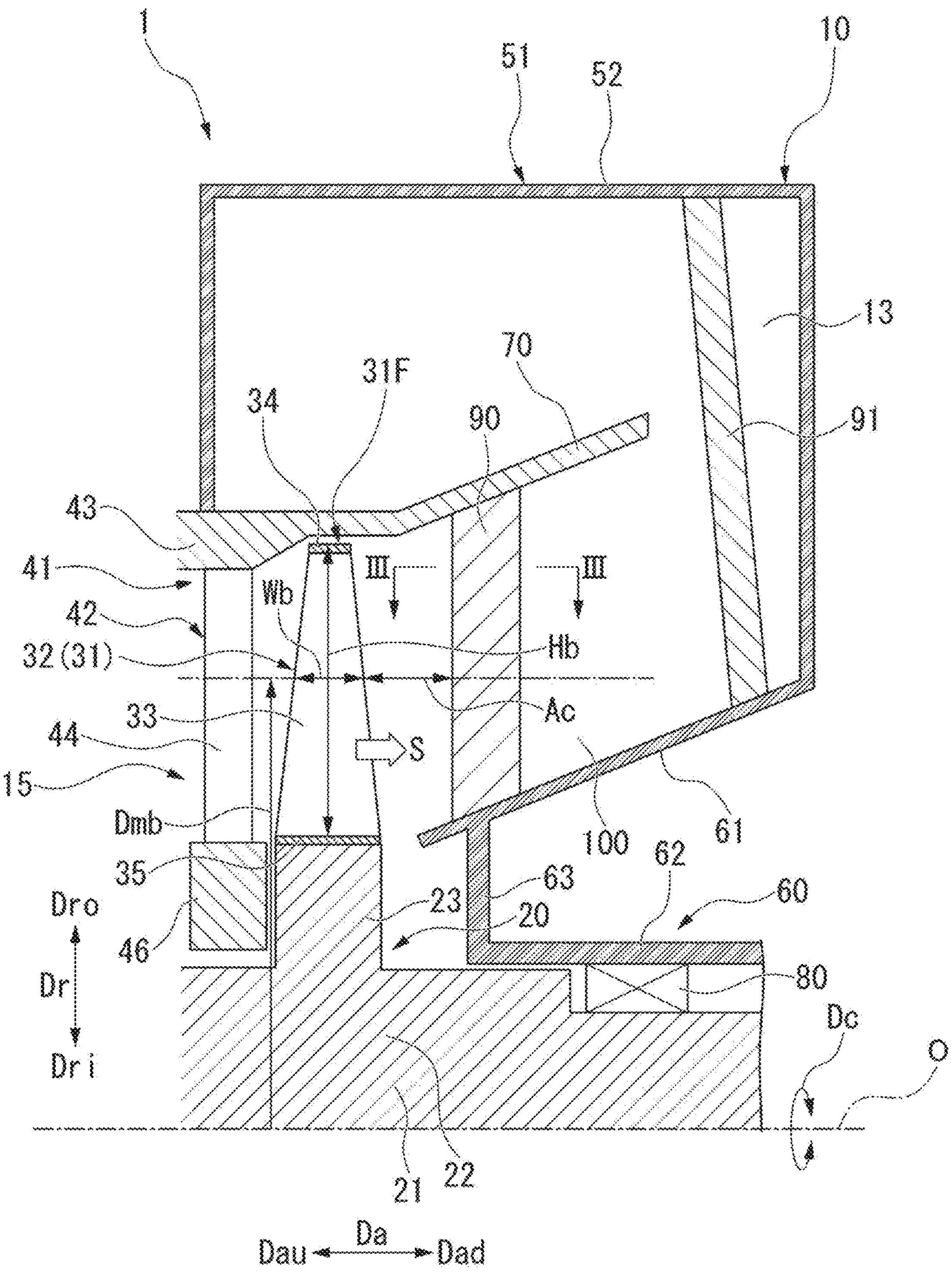
FIG. 2 is a cross-sectional view illustrating a structure around a packing portion and a flow guide of the steam turbine according to the embodiment of the disclosure.

As illustrated in FIGS. 1 and 2, the rotor 20 includes a rotor shaft 21 and a plurality of rotating blade rows 31.

Configuration of Rotor Shaft

The rotor shaft 21 extends in the axial direction Da about the axis O. The rotor shaft 21 is rotatable about the axis O. The rotor shaft 21 includes a shaft core portion 22 and a plurality of disk portions 23. The shaft core portion 22 is formed in a columnar shape about the axis O and extends in the axial direction Da. The plurality of disk portions 23 are arranged at intervals from one another in the axial direction Da. Each of the disk portions 23 is formed integrally with the shaft core portion 22 so as to constitute an outer peripheral portion of the rotor shaft 21. Each of the disk portions 23 is arranged so as to spread to an outer side Dro in the radial direction Dr from the shaft core portion 22.

Configuration of Rotating Blade Row

The rotating blade row 31 is fixed to the outer side Dro in the radial direction Dr of the rotor shaft 21. More specifically, the rotating blade row 31 is fixed to the outer side Dro in the radial direction Dr of a surface of the rotor shaft 21. The plurality of rotating blade rows 31 are arranged at intervals along the axial direction Da of the rotor shaft 21. In the case of the present embodiment, for example, seven rows of the rotating blade rows 31 are arranged. Therefore, in the case of the present embodiment, the rotating blade rows 31 are arranged from the first row to the seventh row of the rotating blade rows 31.

As illustrated in FIG. 2, the rotating blade row 31 of each row includes a plurality of rotating blades 32 arranged side by side in the circumferential direction Dc. A plurality of the rotating blades 32 are attached side by side on the outer periphery of disk portion 23. Each of the rotating blades 32 includes a rotating blade profile portion 33, a shroud 34, and a platform 35.

Each rotating blade profile portion 33 extends in the radial direction Dr. The shroud 34 is arranged on the outer side Dro in the radial direction Dr with respect to the rotating blade profile portion 33. The platform 35 is arranged on the inner side Dri in the radial direction Dr with respect to the rotating blade profile portion 33. The platform 35 is fixed to the disk portion 23. The portion between the shroud 34 and the platform 35 at the rotating blade 32 forms a part of a steam main flow path 15, which is a flow path through which the steam S flows. That is, the steam main flow path 15 is formed between the shroud 34 positioned at an outer peripheral edge of the rotating blade row 31 and the platform 35 positioned at an inner peripheral edge of the rotating blade row 31. By the plurality of rotating blades 32 being arranged side by side in the circumferential direction Dc, the steam main flow path 15 is formed in a circular shape at the outer peripheral portion of the rotor 20.

The rotating blade row 31 arranged closest to the second side Dad in the axial direction Da, that is, the rotating blade row 31 in the last stage is distinguished by attaching reference sign 31F. The blade length of the rotating blade row 31F in the last stage will be described by attaching reference sign Hb. The blade length Hb is the entire length of the blade height from the inner peripheral surface of the platform 35 to the tip end of the shroud 34.

Furthermore, the mean diameter of the blades of all the rotating blade rows 31 (the rotating blade rows 31 of the first row to the seventh row) will be described by attaching reference sign Dmb. The width (length) to the axial direction Da of the rotating blade row 31F in the mean diameter Dmb is a blade width Wb (see FIG. 2).

Configuration of Casing

The casing 10 is formed so as to cover the rotor shaft 21 and the plurality of rotating blade rows 31, that is, the rotor 20. The stator blade row 41 is fixed to the inner side Dri in the radial direction Dr of the casing 10. The plurality of stator blade rows 41 are arranged at intervals along the axial direction Da. In the case of the present embodiment, seven rows of the stator blade rows 41, which is the same number of rows as the rotating blade rows 31, are arranged. The stator blade rows 41 are arranged side by side at intervals on the first side Dau in the axial direction Da with respect to the rotating blade rows 31. The stator blade row 41 constitutes one compression stage together with the rotating blade row 31. Therefore, in the present embodiment, the seven rows of the rotating blade rows 31 and the seven rows of the stator blade rows 41 constitute seven compression stages where the last stage is the seventh stage.

Configuration of Stator Blade Row

The stator blade row 41 of each row includes a plurality of stator blades 42 arranged side by side in the circumferential direction Dc. The stator blade row 41 includes an outer ring 43, a stator blade profile portion 44, and an inner ring 46. The outer ring 43 is formed in an annular shape. The outer ring 43 is arranged on the outer side Dro in the radial direction Dr of the stator blade profile portion 44. The outer ring 43 is fixed to the casing 10. The inner ring 46 is formed in an annular shape. The inner ring 46 is arranged on the inner side Dri in the radial direction Dr of the stator blade profile portion 44. An annular space between the outer ring 43 and the inner ring 46 forms a part of the steam main flow path 15 through which the steam S flows.

The steam main flow path 15 extends in the axial direction Da to span the plurality of rotating blade rows 31 and the plurality of stator blade rows 41. Here, the first side Dau in the axial direction Da is the upstream side in a flow direction of the steam S in the steam main flow path 15. The second side Dad in the axial direction Da is opposite to the first side Dau and is the downstream side in the flow direction of the steam S in the steam main flow path 15. That is, the steam S flows in the casing 10 from the first side Dau toward the second side Dad in the axial direction Da.

The casing 10 further includes an exhaust casing 51, a flow guide 70, and a rib 90. The exhaust casing 51 communicates with the outside of the casing 10. The exhaust casing 51 discharges, to the outside of the casing 10, the steam S having flowed through the steam main flow path 15. The exhaust casing 51 is arranged closest to the second side Dad in the axial direction Da in the casing 10. The exhaust casing 51 includes an exhaust chamber 13 (see FIG. 1) that opens downward. The exhaust casing 51 exhausts, to the outside, the steam S whose static pressure has been recovered by the flow guide 70 described later. The exhaust casing 51 is formed of a steel plate.

The exhaust casing 51 includes an outer wall portion 52 and a packing portion 60. The outer wall portion 52 is a portion forming an outer shape of the exhaust casing 51. The packing portion 60 is a portion to which the bearing 80 (described later) is attached on an inner side of the packing portion 60. The packing portion 60 is arranged on the second side Dad in the axial direction Da relative to the rotating blade row 31F in the last stage, apart from the rotating blade row 31F in the last stage in the axial direction Da. The packing portion 60 is arranged at an interval on the inner side Dri in the radial direction Dr with respect to the flow guide 70. A part of the packing portion 60 is connected to the outer wall portion 52. The packing portion 60 includes a packing outer peripheral portion 61, a packing inner peripheral portion 62, and a packing connection portion 63.

The packing outer peripheral portion 61 is a portion arranged on the outer side Dro in the radial direction Dr that is the outermost in the packing portion 60. The packing outer peripheral portion 61 is formed so as to gradually expand on the outer side Dro in the radial direction Dr from the first side Dau toward the second side Dad in the axial direction Da. The packing outer peripheral portion 61 is formed continuously in the circumferential direction Dc. The packing outer peripheral portion 61 is connected to the outer wall portion 52 at an end portion of the second side Dad in the axial direction Da. The packing outer peripheral portion 61 is connected to the packing connection portion 63 at the first side Dau in the axial direction Da on the inner side Dri in the radial direction Dr.

The packing inner peripheral portion 62 is a portion arranged on the inner side Dri in the radial direction Dr that is the innermost in the packing portion 60. The packing inner peripheral portion 62 is formed in a cylindrical shape extending along the rotor shaft 21. The packing inner peripheral portion 62 is arranged so as to cover the rotor shaft 21 over the entire circumference from the outer side Dro in the radial direction Dr. The packing inner peripheral portion 62 is arranged so as not to contact the rotor shaft 21. The packing inner peripheral portion 62 is not connected to the outer wall portion 52. The packing inner peripheral portion 62 is connected to the packing connection portion 63 at the outer side Dro in the radial direction Dr. In the packing inner peripheral portion 62, a seal member (not illustrated) that prevents the steam S from leaking from a gap with the rotor shaft 21 is arranged on the inner side Dri in the radial direction Dr. The packing inner peripheral portion 62 is attached with the bearing 80 fixed to the inner side Dri in the radial direction Dr. The bearing 80 is a radial bearing that rotatably supports the rotor shaft 21.

The packing connection portion 63 is a portion connecting the packing outer peripheral portion 61 and the packing inner peripheral portion 62 in the radial direction Dr. That is, the packing connection portion 63 is a plate-like portion extending in the radial direction Dr. The packing connection portion 63 is formed continuously in the circumferential direction Dc. The packing connection portion 63 is connected to the packing outer peripheral portion 61 at the outer side Dro in the radial direction Dr. The packing connection portion 63 is connected to the packing inner peripheral portion 62 at the inner side Dri in the radial direction Dr. The packing connection portion 63 is not connected to the outer wall portion 52. That is, the packing portion 60 of the present embodiment is supported by the outer wall portion 52 (connected to the outer wall portion 52) only at an end portion of the packing outer peripheral portion 61, which is an end portion of the second side Dad in the axial direction Da.

Configuration of Flow Guide

The flow guide 70 guides, to the outside of the casing 10 via the exhaust casing 51, the steam S having flowed out of the rotating blade row 31F in the last stage arranged closest to the second side Dad in the axial direction Da among the plurality of rotating blade rows 31. The flow guide 70 is arranged on the second side Dad in the axial direction Da with respect to the rotating blade row 31F in the last stage. The flow guide 70 is formed so as to gradually expand on the outer side Dro in the radial direction Dr from the first side Dau toward the second side Dad in the axial direction Da. The flow guide 70 is formed continuously in the circumferential direction Dc. The flow guide 70 is separated in the radial direction Dr from the packing portion 60. An annular flow path 100, which is a flow path through which the steam S can flow, is defined between the flow guide 70 and the packing portion 60 (packing outer peripheral portion 61). The annular flow path 100 is defined so as to be in a circular shape as viewed in the axial direction Da. The flow guide 70 forms a diffuser for recovering the static pressure of the steam S flowing through the annular flow path 100 together with the packing outer peripheral portion 61. The annular flow path 100 communicates with the main flow path 15 on the first side Dau in the axial direction Da. The annular flow path 100 communicates with the exhaust chamber 13 on the second side Dad in the axial direction Da.

Configuration of Rib

The rib 90 is a portion connecting the flow guide 70 and the packing portion 60 (packing outer peripheral portion 61) and extending in the radial direction Dr. The ribs 90 are arranged at intervals in the axial direction Da from the rotating blade row 31F in the last stage. The plurality of ribs 90 of the present embodiment are arranged at intervals in the circumferential direction Dc. The number of ribs 90 that are arranged is different from the number of rotating blades 32 arranged in the rotating blade row 31F in the last stage. As a specific example, the ribs 90 are arranged at 12 places at equal intervals in the circumferential direction Dc. The rib 90 is connected to the flow guide 70 and the packing portion 60 (packing outer peripheral portion 61) by welding.

Figure 3:
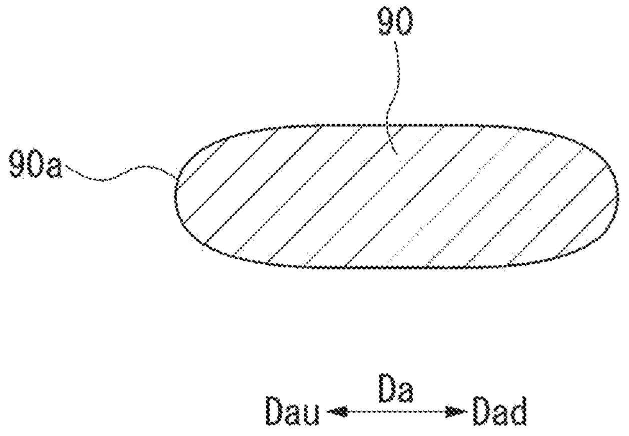
FIG. 3 is a cross-sectional view taken along line III-III in FIG. 2.

The rib 90 is formed in a plate shape as illustrated in the cross-sectional view in FIG. 3. In the rib 90, a tip portion 90*a* on the first side Dau in the axial direction Da is formed in a streamlined shape. That is, the rib 90 is formed such that the shape of a cross section perpendicular to the radial direction Dr is a streamline shape on the first side Dau in the axial direction Da. In the rib 90 of the present embodiment, an end portion on the second side Dad in the axial direction Da is also formed in a streamline shape. Therefore, in the rib 90, both end portions in the axial direction Da including the tip portion 90*a* are formed as curved surfaces.

The rib 90 has the following positional relationship with the rotating blade row 31F in the last stage. The distance in the axial direction Da between the rib 90 and the rotating blade row 31F in the mean diameter Dmb is an axial distance Ac. The axial distance Ac is preferably equal to or more than 1.1 times the blade width Wb. The axial distance Ac is preferably equal to or less than the blade length Hb. In other words, the rib 90 is preferably arranged at a position where the distance in the axial direction Da from the rotating blade row 31F in the last stage is equal to or more than 1.1 times the blade width Wb and equal to or less than the blade length Hb. Furthermore, the axial distance Ac is more preferably equal to or more than 0.1 times and equal to or less than 0.5 times the blade length Hb, and still more preferably equal to or more than 0.2 times and equal to or less than 0.3 times the blade length Hb.

The exhaust casing 51 of the present embodiment further includes a stay 91 as illustrated in FIG. 2. The stay 91 connects in the radial direction Dr the packing portion 60 (packing outer peripheral portion 61) and the outer wall portion 52 on the second side Dad in the axial direction Da relative to the rib 90. The stay 91 is arranged at a position where the distance in the axial direction Da to the rotating blade row 31F in the last stage in the mean diameter Dmb is greater than the blade length Hb. The stay 91 is arranged at a position away on the second side Dad in the axial direction Da with respect to the flow guide 70. The stay 91 is a member having a columnar shape, for example, but is not limited to such a shape. The stay 91 may have a form in which the exhaust casings 51 are connected to each other in the radial direction Dr, or a form in which the exhaust casings 51 are connected to each other in the axial direction Da.

Operational Effects

The steam turbine 1 having the above configuration includes the packing portion 60 and the flow guide 70. The bearing 80 is fixedly attached to the packing portion 60. The packing portion 60 and the flow guide 70 are connected in the radial direction Dr by the plurality of ribs 90. The packing portion 60 is connected to the outer wall portion 52 only on the second side Dad in the axial direction Da. The packing portion 60 is arranged without being in contact with the rotor shaft 21. Therefore, the packing portion 60 is also supported on the first side Dau in the axial direction Da by being connected to the flow guide 70 by the plurality of ribs 90. This improves the rigidity of the packing portion 60. Specifically, the packing portion 60 is suppressed from rubbing around. This makes the bearing 80 more stably supported. Therefore, reliability of axial vibration of the steam turbine 1 can be improved.

The rib 90 is formed (arranged) so as to prevent the flow of the steam S from being obstructed. To prevent the flow of the steam S from being obstructed, it is preferable that no obstacle be within the blade length Hb in the axial direction Da from the rotating blade row 31F in the last stage in the mean diameter Dmb. In the present embodiment, in the rib 90, the shape on the first side Dau in the axial direction Da is formed in a streamline shape. Such a streamline shape of the rib 90 can reduce the resistance force against the flow of the steam S. That is, the rib 90 can prevent separation of the flow of the steam S from occurring. Therefore, such a rib 90 allows the rib 90 to be arranged close to the rotating blade row 31F in the last stage in the axial direction Da. By bringing the rib 90 close to the rotating blade row 31F in the last stage in the axial direction Da, the rib 90 can support the packing portion 60 closer to the first side Dau in the axial direction Da. Therefore, reliability of axial vibration of the steam turbine 1 can be further improved.

The rib 90 is arranged such that the distance (axial distance Ac) in the axial direction Da to the rotating blade row 31F in the last stage is equal to or more than 1.1 times the width (blade width Wb) in the axial direction Da of the rotating blade row 31F in the last stage. This can reduce the exciting force acting on the rib 90. That is, it is possible to suppress vibration that may occur by bringing the rib 90 too close to the rotating blade row 31F in the last stage in the axial direction Da. Therefore, reliability of axial vibration of the steam turbine 1 can be further improved.

The ribs 90 of the present embodiment are arranged such that the number thereof is different from the number of rotating blades 32 arranged in the rotating blade row 31F in the last stage. This prevents the rib 90 from resonating. Therefore, reliability of axial vibration of the steam turbine 1 can be further improved.

Other Embodiments

Although an embodiment of the disclosure has been described in detail with reference to the drawings, a specific configuration is not limited to this embodiment, and design changes and the like in a range not departing from the gist of the disclosure are also included.

Supplementary Notes

The steam turbine 1 according to the embodiment is understood as follows, for example.

(1) The steam turbine 1 according to a first aspect includes: a rotor shaft 21 that rotates about an axis O; a plurality of rotating blade rows 31 fixed to an outer side Dro in a radial direction Dr of a surface of the rotor shaft 21 about the axis O and arranged at intervals in an axial direction Da in which the axis O extends; a casing 10 that covers the rotor shaft 21 and the plurality of rotating blade rows 31; stator blade rows 41 fixed to the casing 10 and arranged at intervals on a first side Dau in the axial direction Da with respect to the rotating blade rows 31; and bearings 80 that are fixed to the casing 10 and rotatably support the rotor shaft 21. The casing 10 includes a flow guide 70 that guides steam S flowing out of a rotating blade row 31F in a last stage arranged closest to a second side Dad in the axial direction Da among the plurality of rotating blade rows 31 to an outside of the casing 10, a packing portion 60 arranged at an interval on an inner side Dri in the radial direction Dr with respect to the flow guide 70, the bearings 80 being attached to the packing portion 60, and a plurality of ribs 90 connecting the flow guide 70 and the packing portion 60, extending in the radial direction Dr, and arranged at intervals in a circumferential direction Dc about the axis O.

In such a steam turbine 1, the bearing 80 is fixedly attached to the packing portion 60. The packing portion 60 is connected to the flow guide 70 by the plurality of ribs 90. Therefore, the rigidity of the packing portion 60 is improved by the plurality of ribs 90. Therefore, reliability of axial vibration of the steam turbine 1 can be improved.

(2) The steam turbine 1 according to a second aspect is the steam turbine 1 of (1), wherein a shape of a cross section perpendicular to the radial direction Dr of the plurality of ribs 90 is formed with a tip portion 90*a* on the first side Dau in the axial direction Da having a streamlined shape.

In such a steam turbine 1, the rib 90 is formed with the shape on the first side Dau in the axial direction Da being a streamlined shape. Therefore, the rib 90 can prevent the flow of the steam S from being obstructed. This enables the rib 90 to be arranged close to the rotating blade row 31F in the last stage in the axial direction Da. Therefore, reliability of axial vibration of the steam turbine 1 can be further improved.

(3) The steam turbine 1 according to a third aspect is the steam turbine 1 of (1) or (2), in which the plurality of ribs 90 are arranged such that a distance in the axial direction Da to the rotating blade row 31F in the last stage is equal to or more than 1.1 times a width in the axial direction Da of the rotating blade row 31F in the last stage.

Such a steam turbine 1 can reduce the exciting force acting on the rib 90. Therefore, reliability of axial vibration of the steam turbine 1 can be further improved.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A steam turbine, comprising:

a rotor shaft that rotates about an axis;

rotating blade rows fixed to an outer side in a radial direction of a surface of the rotor shaft about the axis and arranged at intervals in an axial direction in which the axis extends;

a casing that covers the rotor shaft and the rotating blade rows;

stator blade rows fixed to the casing and arranged at intervals on a first side in the axial direction with respect to the rotating blade rows; and bearings that are fixed to the casing and rotatably support the rotor shaft, wherein the casing comprises:

an exhaust casing arranged on a second side in the axial direction and forming an exhaust chamber that exhaust steam to an outside of the casing;

a flow guide that guides steam flowing out of a rotating blade row in a last stage arranged closest to the second side in the axial direction among the rotating blade rows to the outside of the casing through the exhaust casing; and ribs, the exhaust casing comprises a packing portion arranged at an interval on an inner side in the radial direction with respect to the flow guide, the bearings being attached to the packing portion, the ribs connect the flow guide and the packing portion, extend in the radial direction, and are disposed at intervals in a circumferential direction about the axis, and a distance in the axial direction from the ribs to the rotating blade row in the last stage is equal to or more than 1.1 times a width in the axial direction of the rotating blade row in the last stage and equal to or less than a blade length of the rotating blade row in the last stage.

2. The steam turbine according to claim 1, wherein a shape of a cross section perpendicular to the radial direction of the ribs is formed with a tip portion on the first side in the axial direction having a streamlined shape.

* * * * *